RECORDER FOR OPTICALLY RECORDING A SOUND RECORD AREA

Filed March 1, 1960 11 Sheets-Sheet 1

INVENTOR.
JOHN A. MAURER
BY
Attorneys

RECORDER FOR OPTICALLY RECORDING A SOUND RECORD AREA

Filed March 1, 1960

INVENTOR.

JOHN A. MAURER

BY Hane and Nydick

Attorneys

March 29, 1966 J. A. MAURER 3,243,522

RECORDER FOR OPTICALLY RECORDING A SOUND RECORD AREA

Filed March 1, 1960 11 Sheets-Sheet 3

*INVENTOR.*

JOHN A. MAURER

*BY* Hane and Nydick

Attorneys

RECORDER FOR OPTICALLY RECORDING A SOUND RECORD AREA

Filed March 1, 1960 11 Sheets-Sheet 4

INVENTOR.
JOHN A. MAURER
BY Hane and Nydick
Attorneys

INVENTOR.

JOHN A. MAURER

BY

Hane and Nydick

Attorneys

INVENTOR.
JOHN A. MAURER
BY
Hane and Nydick
Attorneys

RECORDER FOR OPTICALLY RECORDING A SOUND RECORD AREA

Filed March 1, 1960 11 Sheets-Sheet 7

INVENTOR.
JOHN A. MAURER
BY Hane and Nydick
Attorneys

RECORDER FOR OPTICALLY RECORDING A SOUND RECORD AREA

INVENTOR.
JOHN A. MAURER

BY Hane and Nydick

Attorneys

RECORDER FOR OPTICALLY RECORDING A SOUND RECORD AREA

Filed March 1, 1960 11 Sheets-Sheet 9

INVENTOR.
JOHN A. MAURER
BY
Attorneys

*INVENTOR.*
JOHN A. MAURER

*BY* Hane and Nydick
Attorneys

RECORDER FOR OPTICALLY RECORDING A SOUND RECORD AREA

Filed March 1, 1960 11 Sheets-Sheet 11

INVENTOR.
JOHN A. MAURER
BY [signature]
Attorneys 3,243,522

RECORDER FOR OPTICALLY RECORDING A SOUND RECORD AREA

John A. Maurer, New York, N.Y., assignor to The Kalart Company Inc., Plainville, Conn.

Filed Mar. 1, 1960, Ser. No. 12,159
13 Claims. (Cl. 179—100.3)

The present invention relates to strip film bearing one or several programs or presentations, each program comprising a picture area and a sound record area longitudinally spaced on the film, and more particularly to the sound record area of such program. The invention further relates to apparatus for recording sound record lines on the film section assigned to the sound record area of the program.

Broadly speaking, the object of the invention resides in recording an array of discontinuous record lines from which sound can be reproduced in a continuous manner and with satisfactory fidelity by means of a scanning system while the sound record area is held stationary in reference to the scanning system, and resides further in providing apparatus capable of recording record lines on film from which continuous sound reproduction as defined above can be obtained and of effecting such recording in an economically practical manner.

Other and further objects, features and advantages of the invention will be pointed out hereinafter and set forth in the appended claims forming part of the application.

This application is a continuation-in-part of my co-pending application Serial No. 793,329, filed February 16, 1959, now Patent No. 3,108,160.

In the accompanying drawing, several preferred embodiments of the invention are shown by way of illustration and not by way of limitation.

Figures 1, 2, 3, 4, 8:
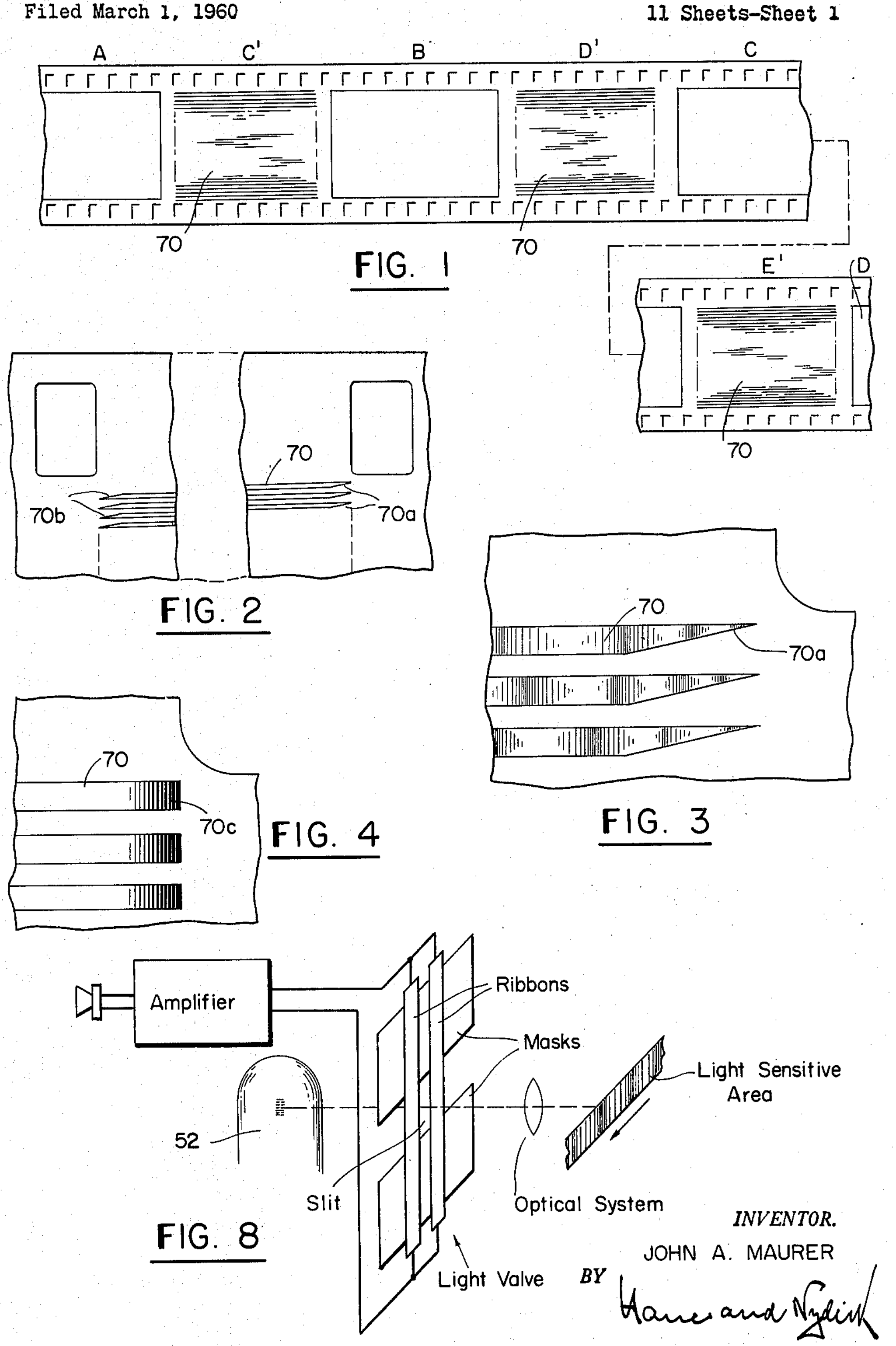
FIG. 1 shows a section of a strip film bearing the picture areas and the associated sound record areas of several programs.
FIG. 2 shows a part of one of the sound record areas more in detail and on an enlarged scale.
FIG. 3 shows tapered end portions of some of the record lines on a further enlarged scale.
FIG. 4 shows modified end portions of some of the record lines on an enlarged scale.
FIG. 8 is a perspective diagrammatic view of a light valve suitable for the apparatus shown in FIGS. 6 and 7.

Referring first to FIGS. 1, 2, 3 and 4 in detail, the strip of film shown in FIG. 1 carries picture areas A, B, C and D which are separated from each other by sound record areas C′, D′, E′, etc. The sound record areas are on the strip of film in advance of the associated picture areas with reference to the direction in which the film is intended to be fed through a sound projector. While the picture areas and the sound areas alternate on the film, the associated areas are not necessarily disposed directly adjacent to each other, and in fact are generally not disposed adjacent to each other. For instance, between picture area C and the corresponding sound record area C′, a sound record area D′ and a picture area B are interposed. The picture area D associated with the sound record area D′ is partly shown, but the sound record area associated with picture area B would be to the left of the figure. The length of each sound record area may be equal to that of a picture area, but it may also be of greater length. For instance, a picture area may occupy one frame and the associated sound record area two frames.

As is apparent, each sound record area includes a plurality of individual, discontinuous and longitudinally oriented sound record lines 70. The sound record lines are parallel to each other, but inclined in reference to either longitudinal edge of the strip of film. While in theory any number of parallel record lines may be provided, in practice the number of lines is determined by the total width of the film, the width of the individual lines and the required spacing between each two lines. The lines should be visualized as constituting part of a helix when a sound record area is brought into a circular configuration.

In order to effect the aforementioned continuous reproduction of sound from the discontinuous lines, each line has at its ends a fade-out section and a fade-in section respectively. These sections are shown as wedge shaped fade-out sections **70*a* and fade-in sections 70*b*. As is clearly shown in FIG. 2, the slanted lines of the two wedge sections 70*a* and 70*b* of each line face in opposite directions at the two ends of each line. The same fade-out and fade-in effect can be obtained by gradually increasing the density of the record lines at each end of the lines as is shown in FIG. 4 at 70*c***. In this figure, the end of each line is shown to be opaque.

Assuming now that scanning for reproduction is effected by scanning successive lines, starting with the lowermost line and progressing toward the uppermost line, it will be observed that scanning of the fade-out section of a line will be coincidental with the scanning of the fade-in section of the next upper line. Consequently, if the scanning operation is so correlated that the scanning of the fade-out section and the next following fade-in section overlap accurately, a continuous reproduction of sound is obtained. In other words, when the sound record areas shown in FIG. 1 are brought into a cylindrical shape, the record lines thereon constitute a continuous helical sound thread of equal width from which continous sound can be reproduced.

The basic problem of putting down on film the aforesaid array of discontinuous lines may be broken down into the following set of requirements:

(1) The lines recorded on the film should be equally spaced.

(2) There should preferably be a slight overlap of the part of the sound record that is near the end of each line and the part that is at the beginning of the next line.

(3) There should be, preferably in the form of a blend or overlap, a fade-out on one record line and a fade-in on the next so that in reproduction a continuous level of output may be obtained while the transition from one line to the next is taking place. This blend may consist of a variation of the width of the lines (FIGS. 2 and 3), or it may consist in a change of density going from normal density to black (FIG. 4).

(4) The linear distance on the film from the record of a given detail of the sound waves near the end of one line to the duplicate record of the same detail near the beginning of the next line (within the overlapped portion) must be exactly the same for all pairs of lines in the record. (This is the distance between the each scanning light beam and the next in the reproducer, which distance must be maintained with high accuracy.)

(5) The record lines should be equally exposed and equally modulated, so that there are no erratic changes in the volume of the sound.

Further requirements are introduced by the need for compressing the record into a comparatively small space. In order to obtain adequate frequency range and volume range in a small space, it is necessary to (1) Produce an exceptionally narrow recording line of light.

(2) Maintain substantially perfect focus of this line of light on the surface of the film used for recording.

(3) Produce a recording line of light that is bright enough to record on film.

Speaking, then, in general terms, in order to make satisfactory records of the kind here involved, the following elements should be provided:

(1) Means of supporting the film in a definite position while one of its frames is being recorded on, and of moving it from one frame to the next.

(2) A light modulator or a plurality of light modulators.

(3) Optical means causing the modulated light to form a succession of equally spaced very fine line images which can be focused accurately on the surface of the film.

(4) Means of moving these line images at constant velocity across the record area of the film.

(5) Means of producing a continuous displacement between the film and the path of the moving lines of light, at right angles to their direction of motion, so that the record is laid down in the form of a series of narrow, equally spaced lines.

(6) Means of gradually cutting off the light in each recording image as it nears the end of its path and at the same time gradually, and at an equal rate, admitting light to the optical parts which form the next line image which is just beginning to traverse its path.

From a practical standpoint a few more general observations may be made.

(1) While it is conceivable that a mechanism might be created which would record on the film while it is held flat, or in some other non-cylindrical shape, an arrangement is preferred which holds the film on a cylindrical surface with the sensitive surface of the film on the concave side, while the optical parts which form the fine recording lines of light are mounted on a support which rotates about the axis of the cylindrical surface. This arrangement is particularly advantageous because it makes it easy to keep the lines of light in accurate focus on the sensitive surface of the film.

(2) In order to obtain the necessary exceptionally fine imagery of the recording lines of light, it is advantageous to make those lens elements which bring the light to its final focus of short focal length and locate them physically near the film surface. This means that there should be a plurality of these lens elements (not fewer than two) and that they should be equally spaced and travel near the film surface at almost the same velocity as the images they form.

(3) Since it is essential that all the lines of the record be exposed equally, it is desirable that the optical systems all derive their light from one light source or at most from two, which can be adjusted to produce equal exposure.

(4) Similarly, it is desirable to use not more than two light modulators, so that it is not too difficult to maintain a constant level of modulation.

In the light of all the above considerations, it may be seen that practicable devices for making the type of record here involved may be of two classes:

(A) Devices in which the light from a single source is modulated by a single light modulator and this light is then optically made to follow a succession of objective lenses mounted on a rotating drum. These objectives lenses act one at a time to bring the light to a focus in the form of a fine line on the film surface, except that when the transfer is being made from one line to the next there is a short interval during which two lenses are receiving light.

(B) Devices in which two light sources and two modulators supply light to two objective lenses which act alternately, the light being cut off from one and admitted to the other by shutters when one line of the record is ending and the next line beginning.

In devices of either class A or class B, the light modulator may be a "light valve" (as made originally by E. C. Wente) or a mirror galvanometer, or a Kerr cell, or a supersonic light modulator of the type recently described in the Journal of the Society of Motion Picture and Television Engineers. The record lines may be of either the variable area or the variable density type.

Referring now to FIGS. 5 to 10, these figures show an embodiment of the invention which comprises a rotating ring or turret 10 open at both ends and carrying in its wall twelve well corrected, spherical lenses 11—11, each consisting of three lens elements. Each of these lenses 11 is mounted in a sleeve 12 which is threaded to facilitate accurate focusing.

The holes in which mounting sleeves 12 are retained in the turret must be indexed very accurately so that the circumferential spaces between all the pairs of adjacent lenses are equal.

The twelve lens systems are uniformly spaced by the circumference of the turret. Turret 10 is supported on a standard 13 which in turn rests upon a base 14 for the entire apparatus. The turret is rotatable on standard 13 and for that purpose a suitable bearing 15 is interposed between the turret and the standard.

Rotation of the turret is effected by means of a suitable motor (not shown) which drives a pulley 16 with which it is coupled by a drive belt 17. Pulley 16 is fixedly seated upon an upright shaft 18 rotatably journalled in base 14 and also fixedly seating a gear 19. Gear 19 is in mesh with a gear 20 secured to turret 10 coaxially therewith.

Figures 5, 6:
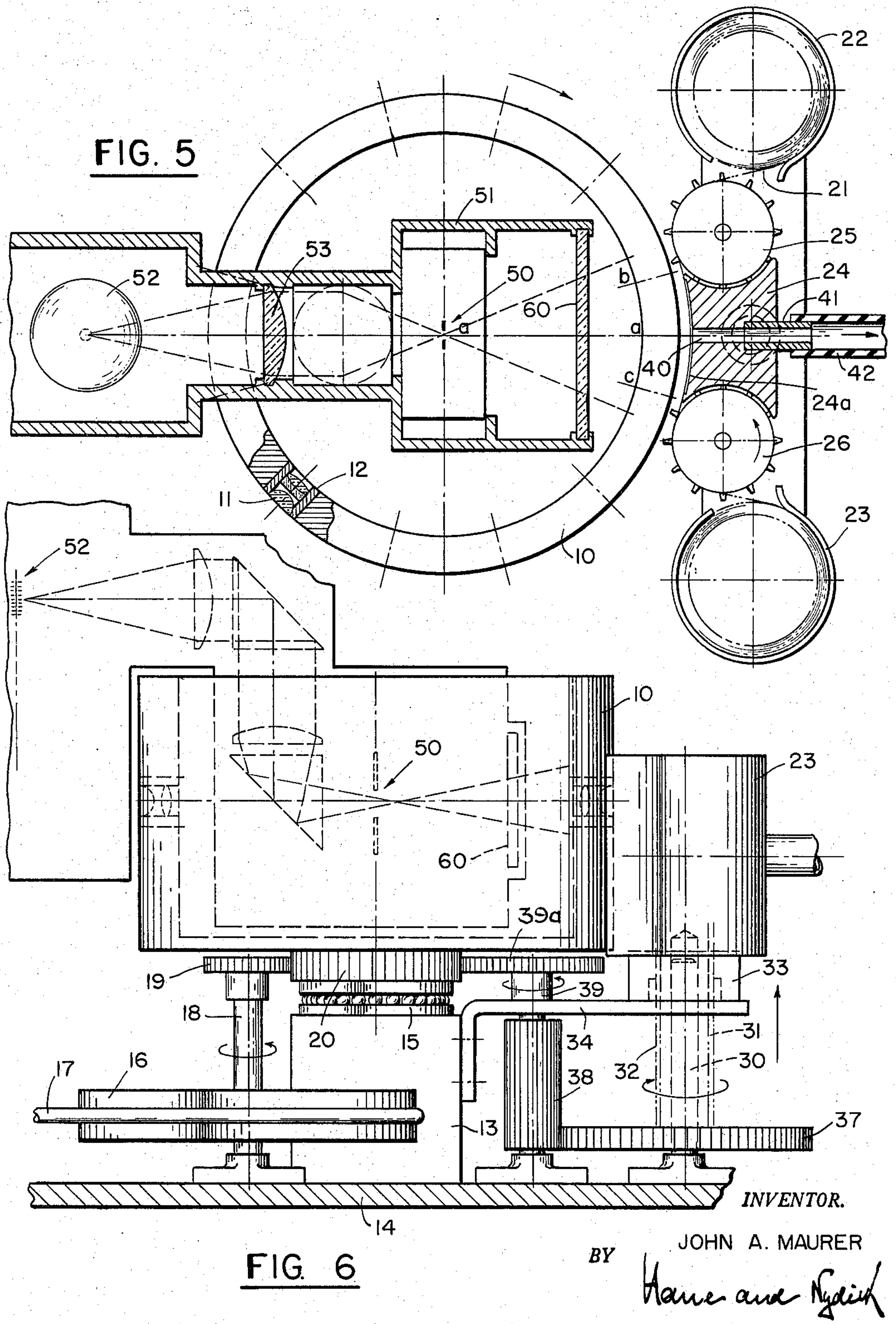
FIG. 5 is a cross-sectional view of an apparatus according to the invention for recording the record lines of a sound record area as shown in FIGS. 1 to 4.
FIG. 6 is an elevational side view, partly in section, of the apparatus according to FIG. 5.

The turret is rotated in the direction indicated in FIG. 5 by an arrow. It should be noted that the drive system for the turret should be highly accurate and it may include a heavy flywheel to insure steadiness of rotation. The film 21 upon which area 70 is to be recorded, as described in connection with FIGS. 1 through 4, travels from a storage container 22 of conventional design to a take-up container 23 also of conventional design. While travelling from container 22 to container 23, the film is guided over a film guide 24 which has on its side facing the turret a concave cylindrical guide surface 24*a*. The curvature of this guide surface is coaxial with the rotational axis of turret 10. The film is transported along the film guide by means of sprockets 25 and 26 of which sprocket 26 is suitably driven in the direction indicated by the arrow.

As is apparent from an examination of FIGS. 1 through 4, the sound record lines of an individual sound record area 70 are recorded longitudinally of the film, generally starting with the lowermost line. Accordingly, as turret 10 is stationary except for rotation, film 21 must perform a motion parallel to the axis of rotation of the turret, that is, vertically in reference to the plane of FIG. 5 and the film must also perform a motion longitudinally of its length. The latter motion is effected by rotation of sprocket 26 and is required only after the recording of a sound record area 70 has been completed and a new area of film must be placed upon guide surface 24*a* for recording.

As is now apparent, the film must perform a downward movement from an uppermost position at the beginning of the recording to a lowermost position in reference to turret 10 and must be returned into its uppermost position upon completion of a recording to ready the apparatus for recording of the next sound record area 70.

To effect the aforementioned up and down movements of the film, the entire film assembly is supported on a guide shaft 30 which in turn is secured to base 14. A sleeve 31 slidable on shaft 30 has an external thread 32 threaded through a nut 33 which is secured by means of a bracket 34 to standard 13, or any other suitable stationary part of the apparatus such as base 14. The sleeve is coupled to guide member 24 so that the sleeve can rotate relative to the guide member, but not move axially relative thereto. For this purpose, a grooved collar 35 is secured on sleeve 31 and fitted in a suitable bore of the guide member. A set screw 36 engages the groove of the collar thus permitting rotation and preventing an axial displacement of the guide member and the sleeve in reference to each other. Guide shaft 30 seats fixedly a gear 37 which is in mesh with an elongated pinion 38 so that the entire film assembly can ride up and down on shaft 30. The lowermost position of the film assembly is shown in FIG. 6 and the uppermost position in FIG. 7. Pinion 38 is seated on a shaft 39 which also seats a gear 39*a*. This gear is in mesh with gear 20.

As is now apparent, rotation of pulley 16 will be transmitted through the aforedescribed gear train to gear 37. As a result, threaded sleeve 31 will screw itself up and down in nut 33 thereby causing a corresponding displacement of the film assembly in reference to turret 10.

Figure 7:
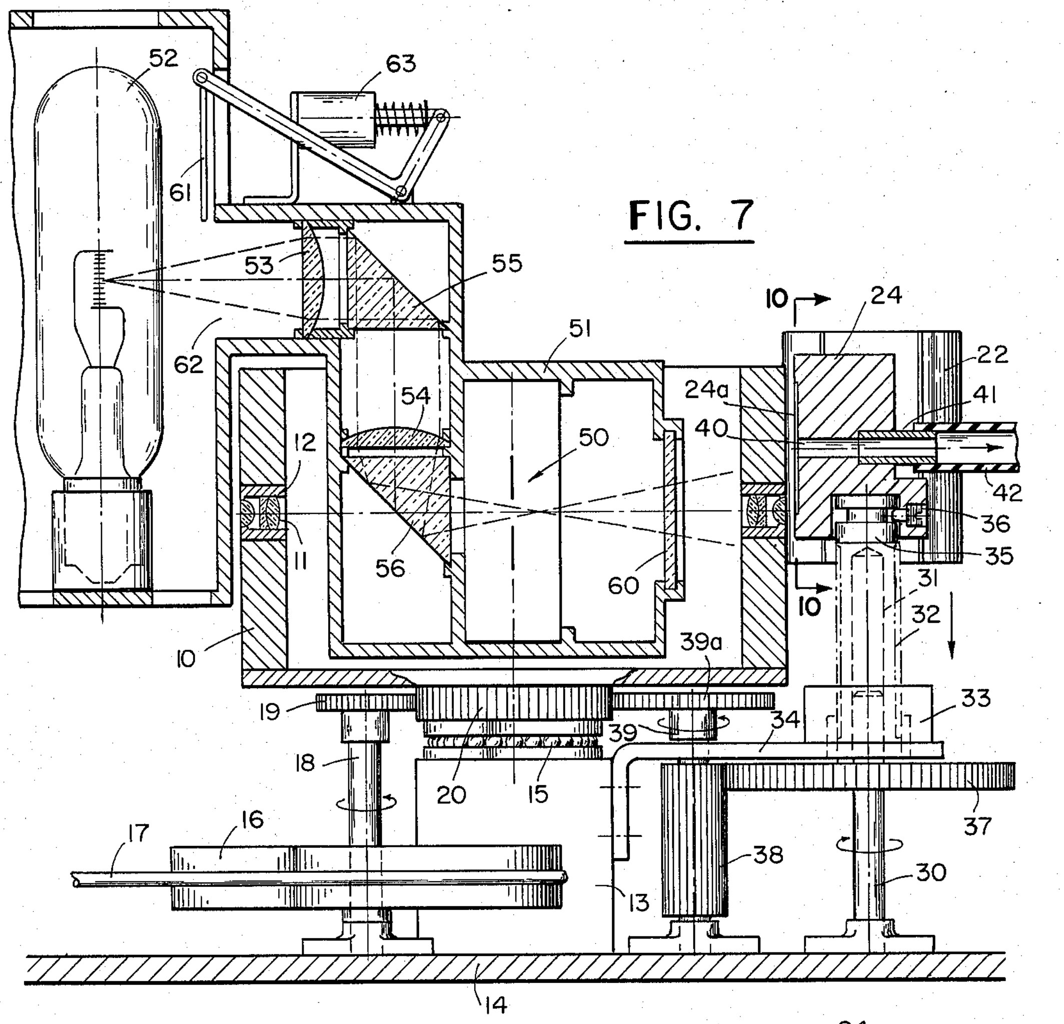
FIG. 7 is a sectional elevational view similar to FIG. 6.

The gear ratios of the gears included in the transmission are so selected that the upward movement of the film assembly from the lowermost position at the beginning of a recording as shown in FIG. 6 toward the uppermost position of FIG. 7 is correlated with the rate of rotation of the lenses in turret 10.

Figure 10:
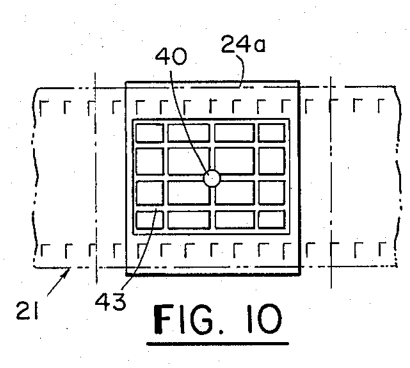
FIG. 10 is a detail view taken on line 10—10 of FIG. 7.

As has been stated before, the curvature of guide surface 24*a* is coaxial with that of turret 10. In order to obtain a satisfactory recording, it is essential that the portion of the film placed upon the guide surface follows very accurately the contour thereof. To enforce such configuration of the film, it is advantageous to suck the film by a slight vacuum against the guide surface. To this end, a bore 40 through guide member 24 is provided. Bore 40 is coupled by any suitable means such as a coupling sleeve 41 to a hose 42 which should be visualized as being connected to a suitable source of vacuum. In order to distribute the vacuum over the guide surface 24*a*, a network of very fine slots 43 is preferably provided in the guide surface. These slots all communicate with each other and bore 40 as is shown in FIG. 10. As is evident, the vacuum is present over substantially the entire area of the guide surface and therefore, the film is held firmly in contact with it. The vacuum may be destroyed when the film is transported for advancing a new film portion into position toward recording, but it is preferable to maintain some vacuum at all times to keep the sensitive side of the film which faces the turret from rubbing against the turret.

*Light modulating assembly of the apparatus*

The light modulating assembly comprises a light valve 50. This valve is indicated diagrammatically in FIGS. 5, 6 and 7 and shown somewhat more in detail in FIG. 8. The light valve should be visualized as being basically of conventional design. Suitable light valves are available on the market. The light valve as shown in FIG. 8 comprises two ribbons capable of oscillating and mounted in front of masks. The two ribbons define a slit, the length and width of which are indicated in FIGS. 5, 6 and 7. As is well known, sound transmitted to the ribbons through an amplifier will cause the ribbons to oscillate thereby correspondingly modulating a light beam directed by a source of light through the slit and an optical system upon a light sensitive area moved relative to the light beam in the direction indicated in FIG. 8 by an arrow. The light incidence upon the sensitive area will correspond to the sound to be recorded.

The light valve is mounted within turret 10 into which it depends from the open top thereof, independent of the turret and stationary relative thereto. There is shown a frame 51 which supports the light valve proper and also the other components of the light moduluating system. This system comprises a lamp 52 having a suitable filament. The light from the lamp is brought to the slit of the light valve by means of lenses 53 and 54 and prisms 55 and 56, all mounted in frame 51.

The plane of the light valve ribbons is at right angles to the line $\alpha$—$\alpha$ leading from the slit between the ribbons to the center of guide surface 24*a* and thus also to the center of the area 70 on the film. Accordingly, lenses 11, as they pass from the side *b* to the side *c* of guide surface 24*a*, are in the most favorable position to form images of the light valve slit on the light sensitive surface of the film which is held in position by the vacuum. An image of the lamp filament is formed in or near the plane of the ribbons by a cone of light of such angular aperture that the diverging beam of light that has passed through the slit of the light valve more than fills the angle from *b* to *c*. Thus, when any one of the lenses 11 is in any position from *b* to *c*, a brightly illuminated image of the slit of the light valve will be projected on the sensitive surface of the film.

In order to obtain fully satisfactory results as to the definition and uniformity of the image, a corrective filter 60 is preferably interposed between the light valve and the revolving lens systems 11. The filter is mounted in in frame 51 in a plane parallel to that of the ribbons of the light valve. When lens systems 11 are in the side positions toward *b* and *c*, they receive light from the light valve under a slightly oblique angle. As a result, the exposure of the film by the image tends to be slightly less at or near the ends of the record lines than it is at the center. Such differential in the incident light can be conveniently compensated by means of filter 60 by giving the same a slight light absorption in its central parts while leaving it clear toward its marginal parts. In the apparatus shown, filter 60 serves the further purpose of giving the graded cut-off of the record lines at their ends so as to obtain the overlap discussed in conpunction with FIGS. 1 through 4 which is required to make a continuous reproduction possible. For this purpose, filter 60 is made opaque at its ends, with the opacity grading over a short distance to complete transparency inside each end portion. Evidently, the spacing of the graded portions must be correct with respect to the circumferential spacing of the lens systems 11 and the distances of these lens systems and of the filter from the light valve slit. Some overlap adjustment is possible for the purpose of obtaining a perfect overlap of the ends of adjacent record lines by changing the distance of filter 60 from the light valve. By appropriately grading the marginal light absorption of the filter, either the overlap configuration of FIG. 3 or of FIG. 4 can be readily obtained.

Figure 9:
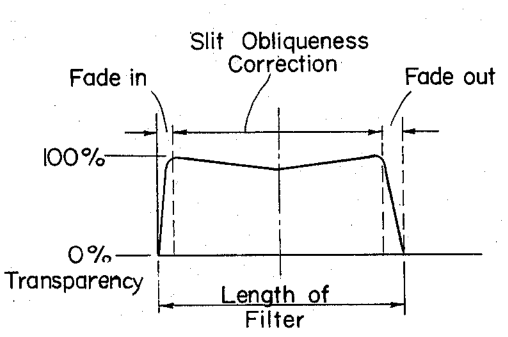
FIG. 9 is a diagram of the transparency of a filter used in the apparatus according to FIGS. 5 through 7.

FIG. 9 shows in graph form the transparency of the filter in reference to its diameter to obtain the required fade-in and fade-out and the compensation in the middle portion of the filter.

When it is desired to make a recording, the film guide assembly is first moved into the uppermost position shown in FIG. 7. An image formed by any one of the lens systems will then fall upon the lower edge of the part of the film between the longitudinal rows of perforations of the film. If the light valve is now actuated in the usual way by audio-frequency signals from a suitable amplifier as has been indicated in connection with FIG. 8 and shafts 18 and 30 are rotated, turret 10 will revolve about the light valve and in reference to the film guide assembly and the film guide assembly will gradually climb downwardly toward the position of FIG. 6 as has been previously described. The rate of rotation and the rate of axial movement of the film guide assembly must, of course, be correlated in accordance with the number and spacing of sound record lines to be recorded on an area 70. As is apparent, a negative record will be gradually recorded, starting with the lowermost record line, on the film area placed in front of the lenses and this recording is completed when the film guide assembly reaches the position of FIG. 6, or any selected intermediate position depending upon the length of a recording assigned, to a given record area 70. When a recording is completed, the apparatus is stopped by any suitable means and the film guide assembly is returned into the position of FIG. 7.

It is, of course, also possible to reverse the motion of the film guide assembly from a downward motion to an upward motion during recording. It is furthermore possible to start the recording in an intermediate position of the film guide assembly and to terminate it any desired position of the assembly, again depending upon the length of the recording to be made on a given record area 70.

A new area 70 is moved into the position for recording by rotating sprocket 26 through an appropriate angle. The vacuum acting upon the film advancing over film guide surface 24$a$ is preferably partly retained during movement of the film to hold the moving film at all times against guide surface 24$a$ thus avoiding any damage of the sensitized surface of the film by engagement with the wall of turret 10.

Lamp 52 may be switched off during the film transport, but it is preferable to oburate the optical system during the film transport rather than to swich off the light since it takes considerable time until the light becomes fully stabilized after being switched on again. A shutter blade 61 is shown which, during recording, is suitably retained, for instance, by means of a spring in the position shown in FIG. 7, but can be moved into a position closing light gate 62 by energizing a solenoid 63.

In the apparatus according to previously described FIGS. 5 through 10, the light modulating device is a light valve and the only rotary component is the turret or lens drum 10, except, of course, the gear trains coacting with the turret and the film guide assembly.

Figures 11, 12, 13:
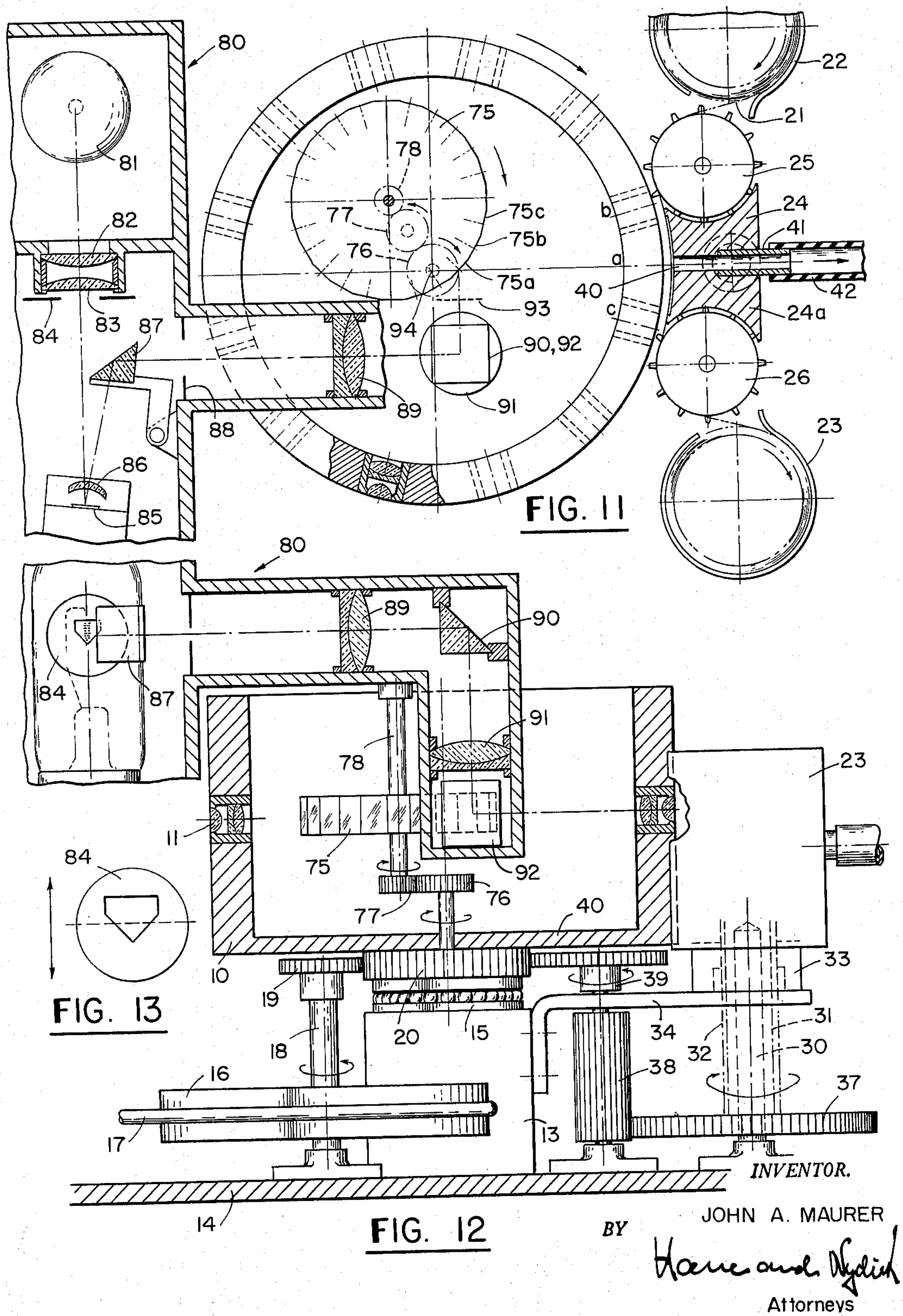
FIG. 11 is a cross-sectional view of a modification of the apparatus for recording sound record lines according to FIGS. 1 through 4.
FIG. 12 is a side view, partly in section, of the apparatus according to FIG. 11.
FIG. 13 is a detail view of one of the components of the apparatus according to FIGS. 11 and 12.

FIGS. 11 through 13 show a related but modified system in which the light valve is replaced by a mirror galvanometer and associated optical system.

The apparatus comprises again a turret 10, lens systems 11 and a film guide assembly performing a rectilinear motion in reference to the rotary turret. The same components are designated by the same reference numerals.

A polygonal mirror prism 75 is rotatably mounted within the turret 10. The rotational axis of the mirror is parallel to the rotational axis of the turret, but eccentric in reference thereto. The rotation of mirror 75 is derived from the input drive shaft 18 and is transmitted by gears 76, 77 to geared mirror shaft 78. As is indicated in FIG. 11, mirror 75 rotates in the same direction as turret 10, and the ratio of transmission is such that the mirror rotates at half the number of revolutions of the turret in any given time interval, that is, at half the angular velocity of the turret. The mirror has a plurality of circumferentially disposed plane mirror faces 75$a$, 75$b$, 75$c$ . . . 75$n$. The number of mirror faces is twice the number of lens systems 11 in the periphery of turret 10.

The mirror galvanometer is mounted in a housing 80. The light for it is derived from a lamp 81 and is directed through a pair of collective lenses 82, 83 and a mask 84 to the mirror 85 of the galvanometer proper. A lens 86 is disposed in front of the galvanometer mirror. The light incident upon mirror 85 is directed to a totally reflecting prism 87. Lens 86 forms an image of mask 84 which is in focus on a slit 88, the length and width of which are apparent from FIGS. 11 and 12 respectively. A suitable configuration of mask 84 is shown in FIG. 13.

When the galvanometer is excited by audio frequency currents derived from a suitable amplifier (not shown), mirror 85 oscillates about an axis which is in the plane of the drawing and the image of mask 84 moves across slit 88 in a direction at right angles to the length of the slit. Thus, the length of slit 88 which is illuminated, varies from instant to instant as a function of the audio signals.

The light passing through slit 88 is transmitted through lenses 89, prism 90, lens 91 to prism 92. The path of light is clearly indicated in FIGS. 11 and 12 by dotted lines. Prism 92 directs the light upon a mirror face in the appropriate position: in the illustration, the light is directed upon mirror face 75$a$. Lenses 89 and 91 are so corrected that they act to form a well defined image of slit 88 in the position of dotted lines marked 93. The two reflections effected at prisms 90 and 92 turn the image so that the image 93 has its length vertical while the original slit 88 has its length horizontal.

The reflection of the light beam at face 75$a$ of mirror prism 75 causes the light to proceed toward the point $a$ as through it had come from a point 94 which is on the axis of rotation of turret 10. As turret 10 and mirror 75 turn at a correlated and synchronous rate of speed, one face of the mirror will pass the light beam each time that one of the lens systems 11 travels from position $b$ to position $c$. As a result, the reflection of the light beam from the mirror faces causes the beam to follow the lens systems so that while the lens systems are passing in front of the film on guide surface 24$a$, each one will re-image the slit image at 93 as a very narrow, bright line on the film.

When one of the junctions or vertices between two mirror faces passes through the light beam, the beam is divided, part of the beam being reflected to that one of lens systems 11 which has been passing from $b$ to $c$ and part of the beam being reflected by the next succeeding mirror face 75$b$ to fall into the next lens system in the sequence. When the vertex of the two mirror surfaces 75$a$ and 75$b$ has passed entirely through the beam of light, the entire beam is reflected to the "next" line. Thus the required and aforedescribed gradual transition between each two successive record lines is automatically effected by the coaction of the faces and vertices of polygonal mirror 75.

The operation of the apparatus according to FIGS. 11 through 13 is evident from the previous description.

FIGS. 14 through 20 show an apparatus in which two light modulators are used and simultaneously supplied with the same audio signal. The two light modulators shown in the apparatus according to FIGS. 14 through 20 are mirror galvanometers.

In order to record an array of parallel record lines on successive film areas, the apparatus must perform the following operations:

(1) The two light modulators are alternately operative to record successive record lines in parallel relationship.

(2) The modulated images derived from the modulators are caused to follow a helical path while the film area itself is held stationarily.

(3) The sound recordings at the end of each line and at the beginning of the next succeeding line are caused to blend into each other.

(4) Upon completion of the recording on one film area, the entire optical assembly of the apparatus is returned into its initial position for beginning the recording on a new film area.

(5) The film is advanced for moving a new record area into position for recording.

(6) The beam of light is blocked in the interval between the completion of one recording and the beginning of the next recording to prevent fogging of the film during such interval (optional).

Figure 14:
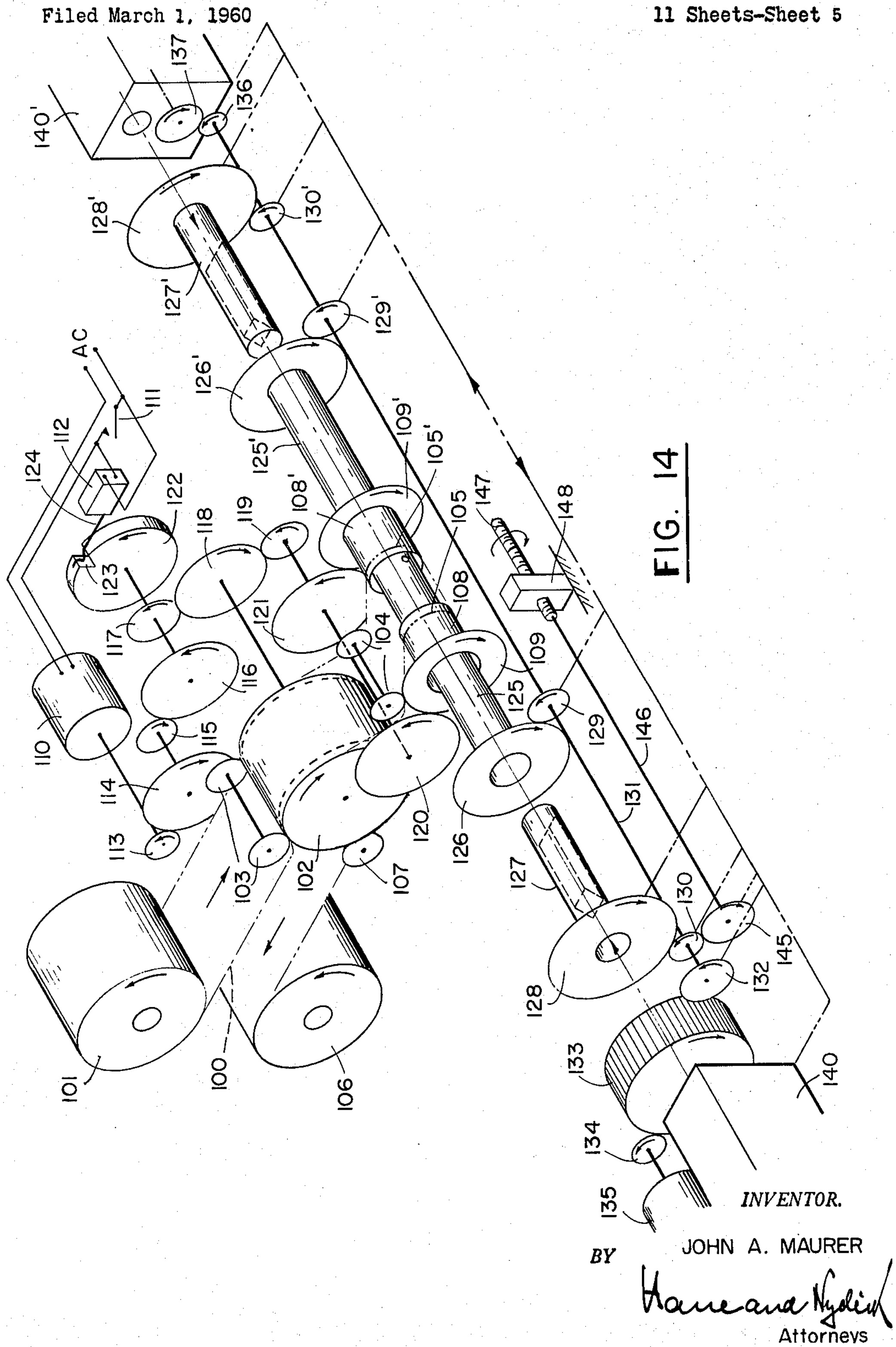
FIG. 14 is a perspective view of a further modification of an apparatus according to the invention, and showing the drive mechanism of the apparatus in diagrammatic presentation.
Figure 15:
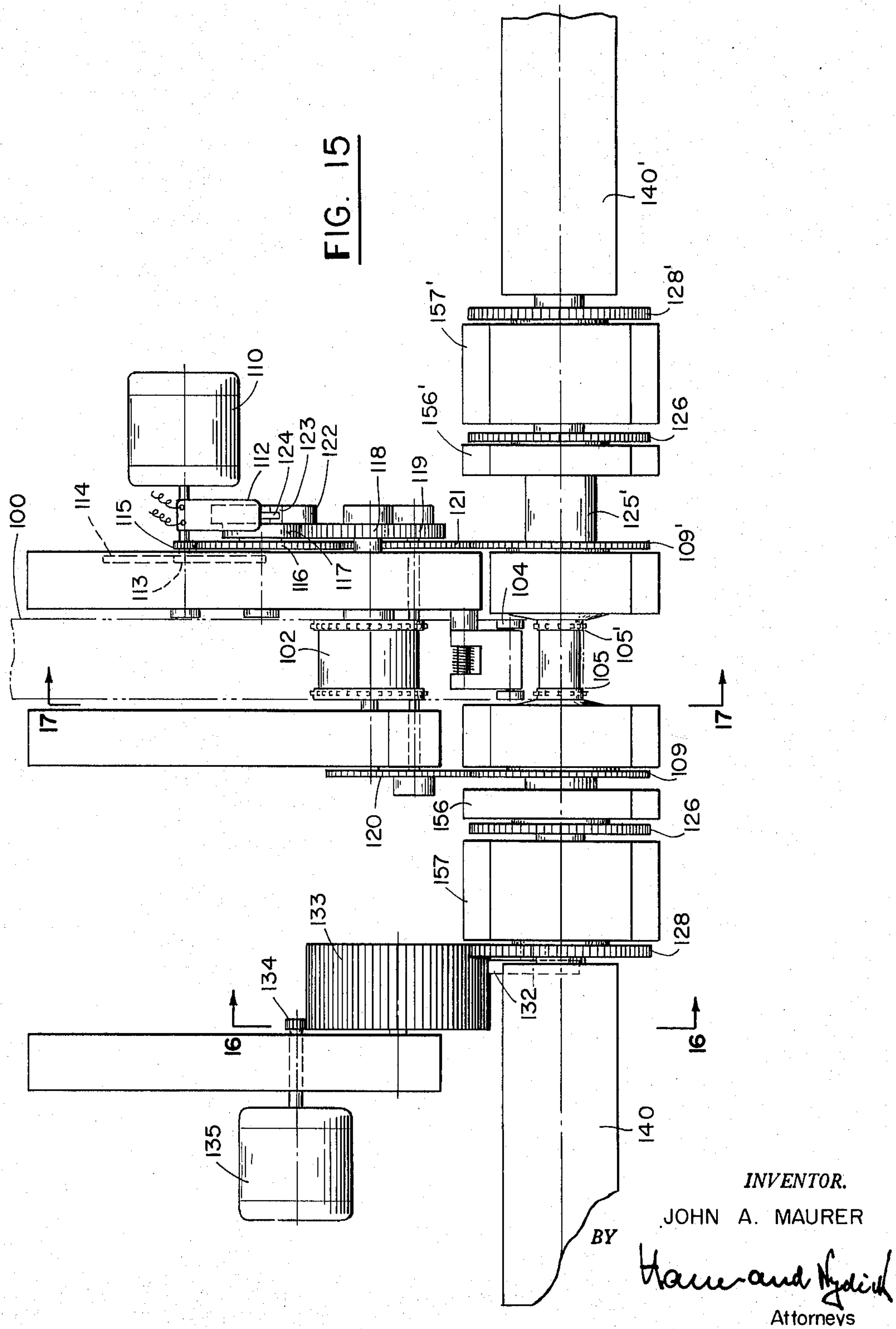
FIG. 15 is a plan view of the apparatus of FIG. 14 showing the structure thereof.
Figure 16:
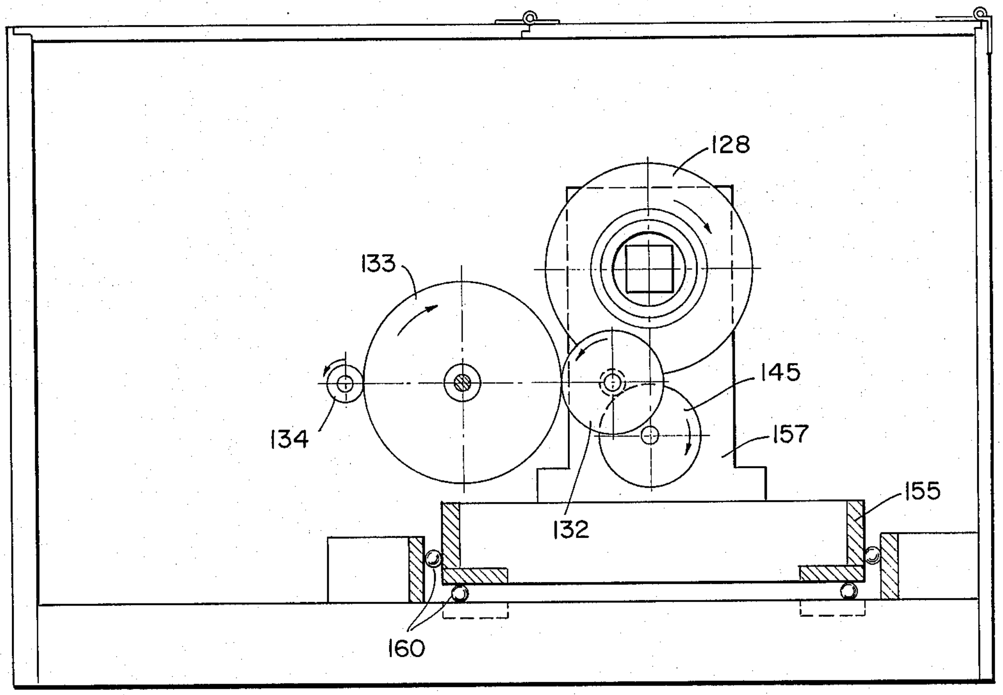
FIG. 16 is an elevational view, partly in section, taken on line 16—16 of FIG. 15.
Figure 17:
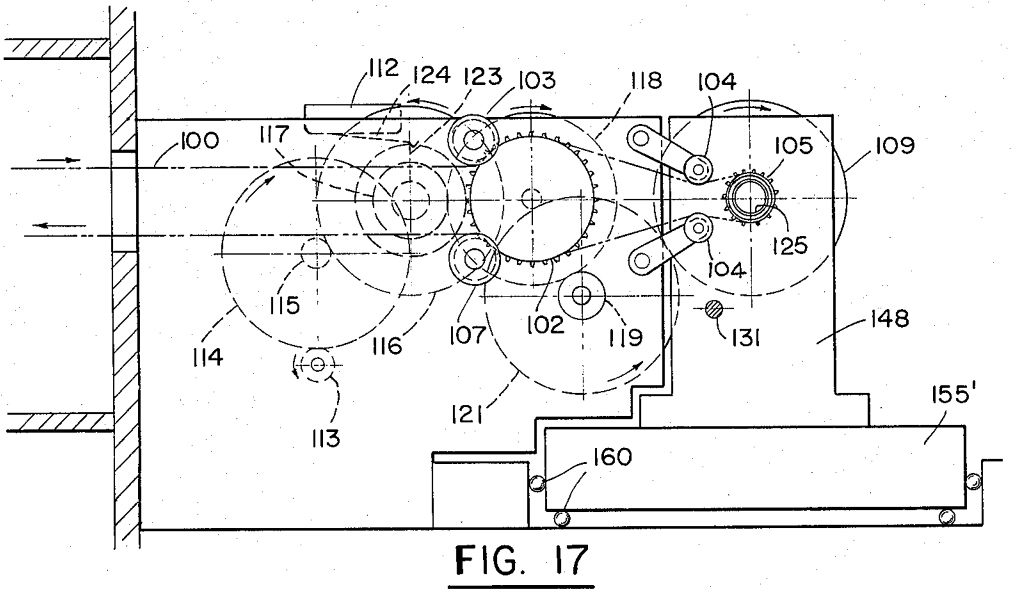
FIG. 17 is an elevational view, partly in section taken on line 17—17 of FIG. 15.

Turning now to FIGS. 14 through 20 and first to FIG. 14, this figure shows diagrammatically the general drive mechanism of the apparatus.

Film 100 is supplied to the apparatus from a supply reel 101. The film is guided, emulsion facing downward, over a sprocket drive 102 and held under tension by spring loaded idler rolls 103 and 104. The film reaches the apparatus from behind, and at the top of guide sprockets 105 and 105'. As seen in the figure, it is guided downwardly on the side of the guide sprockets facing the observer and then guided back to a take-up reel 106 while held under tension by idler rolls 107. Recording is effected upon the film portion resting upon guide sprockets 105 and 105' as will be more fully explained hereinafter. The film is in contact with guide sprockets 105 and 105' for somewhat more than 180° of their circumferences, actually for about 210°. As the film is held under tension and supported along its margins by the cylindrical peripheries of the guide sprockets, it will lie very accurately in the form of a portion of a cylinder for about 190° of its wrap around the support. Sprocket 105 is integral with or fixedly joined to a rotatable sleeve 108 which also seats a gear 109. Similarly, guide sprocket 105' is jointly rotatable with a sleeve 108' and a gear 109'.

Both sleeves 108 and 108' can be rotated or held stationary independent of the optical system of the recording apparatus as will be more fully explained hereinafter. The drive for sprocket 102 is derived from a motor 110. This motor is connected to an A.-C. source through a main switch 111 and a control switch 112 which could be visualized as a normally open switch. Motor 110 drives sprocket 102 through a gear train including gears 113, 114, 115, 116, 117 and 118. A second gear train including gears 119, 120 and 121 drives gears 109 and 109'. The arrangement of the gear trains is believed to be quite clear from FIG. 14 and the ratios of transmission of the gear trains are so selected that gears 109, 109' and sprocket 102 will rotate at synchronized equal speed and at an appropriate rate.

As stated before, the film is held stationary during each recording and advanced upon completion of a recording. In order to effect such intermittent transport of the film, gears 116 and 117 are mounted on a common shaft with a cam disc 122. This disc is shown as having a peripheral notch 123 which controls an actuating arm 124 of switch 112. When the arm rests in the notch, switch 112 is in its open position, but when arm 124 rides upon the periphery of disc 123, switch 112 is held closed.

As shown, the circuit for motor 110 is interrupted at both switches 111 and 112. Let it now be assumed that switch 111, which may be a push button switch, is temporarily closed. A circuit for motor 110 is then established bypassing switch 112. Accordingly, the motor is started and begins to advance film 100 and also to turn cam disc 122. Arm 124 now rides on the periphery of disc 122 and the motor circuit remains closed when switch 111 is opened, until arm 124 re-enters notch 123 after one revolution of disc 122. The circumference of disc 122 is selected so that film 100 is advanced sufficiently to place a new film portion in position for recording. In order to restart motor 110, switch 111 must again be closed. This can be effected manually as stated before, or be automatically controlled by any suitable cycle timer known for the purpose.

Some of the optical components of the apparatus are diagrammatically indicated in FIG. 14. They are housed in tubular members 125 and 125' to which are secured gear rings 126 and 126' respectively, and in tubular members 127 and 127' with gear rings 128 and 128' secured thereto. The two pairs of tubular members are disposed coaxial with sleeves 108 and 108', and rotatable independent of said sleeves and each other.

Gear rings 126 and 126' are in driving engagement with gears 129 and 129' respectively and similarly, gear rings 128 and 128' are in driving engagement with gears 130 and 130' respectively. Gears 129, 129', 130 and 130' are seated on a common shaft 131 which further seats a gear 132. Gear 132 is in driving engagement with a gear 133 which is driven through a gear 134 by a motor 135. Shaft 131 further seats two gears 136, each of which (only one gear 136 being visible in FIG. 14) drives through a gear 137, a shutter 138 and 138' respectively (see FIGS. 18 and 18A). Each of the shutters coacts with a respective mirror galvanometer 140 and 140', respectively as will be more fully explained in the subsequent description.

The two mirror galvanometers are disposed in alignment with the aforedescribed drive mechanism so that the modulated light beams emanating from galvanometers are coaxial with tubular members 108, 108', 125, 125', 127 and 127'.

As previously explained, sprockets 105, 105' and tubular members 108, 108' with gears 109, 109' are rotatable but axially stationary. The tubular members 125, 125', 127 and 127', the shaft assembly 131 and the two galvanometers are jointly axially displaceable in either direction in reference to tubular members 108 and 108' but not in reference to each other, or in other words, the entire system is displaceable in the direction of the arrows in FIG. 14. To permit such displacement, gear 133 which is axially stationary, is a wide gear so that gear 132 can travel longitudinally of gear 133 without losing driving engagement therewith. Linking chain lines indicate all the components that participate in the axial displacement. The mechanism effecting the axial displacement is indicated in FIG. 14 by a gear 145 driven by gear 130 and seated on a shaft 146. Shaft 146 mounts a threaded portion or lead screw 147 which is threaded through a stationarily mounted block 148. As is apparent rotation of shaft 146 will effect longitudinal displacement of the shaft in reference to block 148 and it should be assumed for the time being that such displacement effects displacement of the entire linked system in one or the other direction, depending upon the rotational direction of shaft 146.

FIGS. 15 through 19 show the drive system diagrammatically illustrated in FIG. 14, in structural detail. The same reference numerals are used in these figures to designate the same or corresponding components, and it is believed that the function of the structure according to FIGS. 15 through 19 will be generally apparent from the description of FIG. 14 and a comparison of that figure with FIGS. 15 through 19.

Referring now to the structural details of the drive mechanism not heretofore described, tubular members 108 and 108' are rotatably supported by means of suitable bearings 150 on block 148. This support is stationarily mounted on a bed 151 for the entire recording apparatus. As is apparent, block 148 which is shown diagrammatically in FIG. 14 has two branches, each supporting one of tubular members 108. As as evident from FIGS. 14 to 19, the recording apparatus comprises two axially displaceable symmetric halves, one disposed to the left and the other to the right from the stationary center part including tubular members 108, 108' and the film supporting sprockets 105 and 105'. All the components in the left hand part of the apparatus are mounted on a carriage 155 and all the components on the right hand part of the apparatus on a similar carriage 155'. To permit rotation of gear 126 independent of gear 128, tubular member 125 of which gear 126 forms a part, is rotatable on a support 156 rising from carriage 155 and tubular member 127 of which gear 128 forms a part, is rotatably supported on a support 157 also mounted on carriage 155. Each of the tubular members is mounted in its support by suitable ball bearings 158 and 159 respectively. The arrangement of the components on the right hand side of the apparatus is the same as is indicated by the use of primed reference numerals. Carriages 155 and 155' are longitudinally movable on bed 151 in reference to the stationary support 148. Rolls 160 are shown to indicate such movability. Displacement of support carriages 155 and 155' is effected as described in connection with FIG. 14 by rotation of lead screw 147 in a threaded bushing 161 fitted in block 148. Bushing 161 and shaft 146 are accurately located in their respective supports by collars and flanges.

Figures 18, 18A, 19:
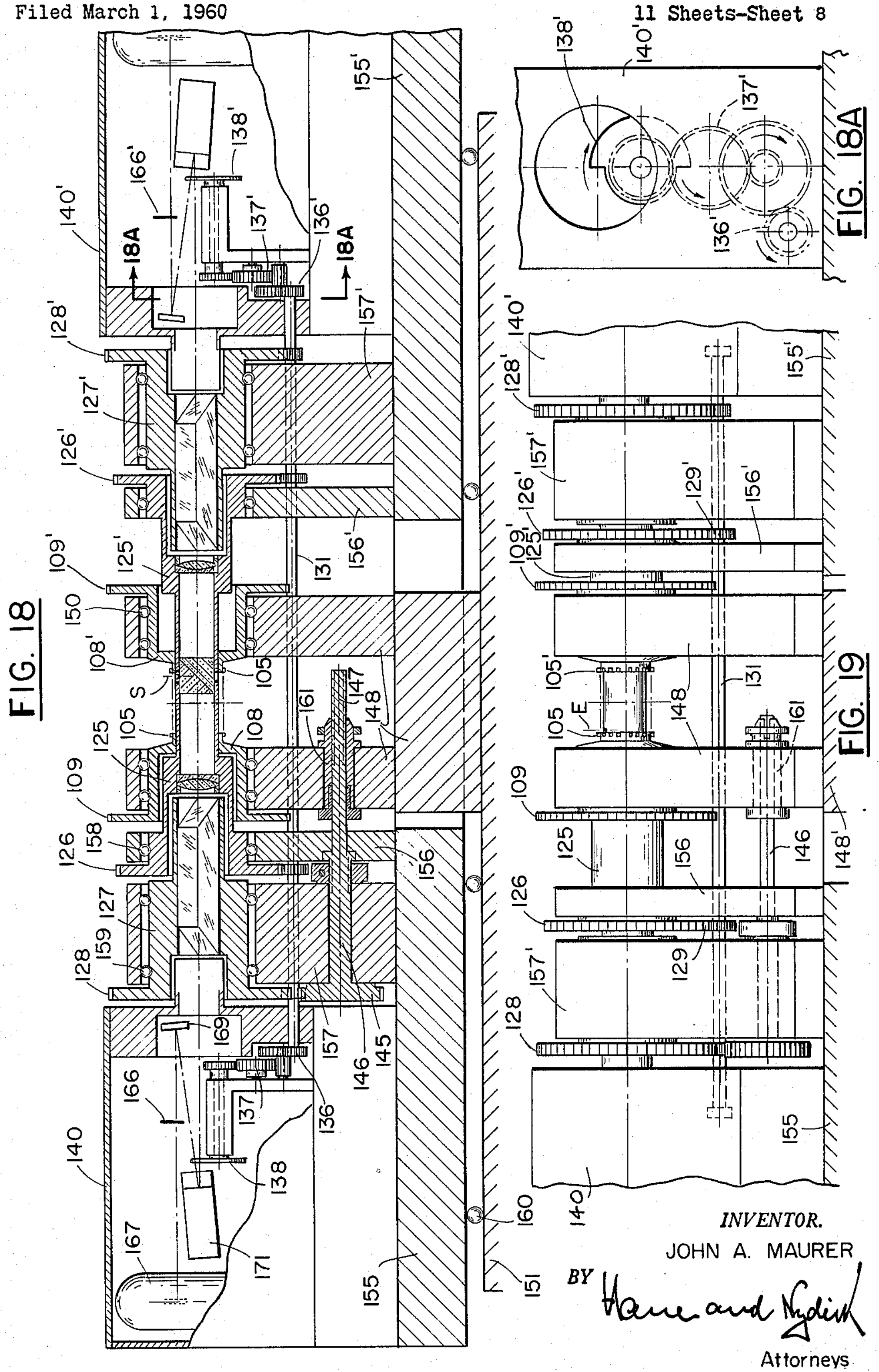
FIG. 18 is an elevational sectional view of FIG. 15, showing in detail the structural features of the drive mechanism.
FIG. 18A is a section taken on line 18A—18A of FIG. 18.
FIG. 19 is an elevational view similar to FIG. 18.

FIG. 18 shows the entire assembly in its limit position towards the right and FIG. 19 in its limit position towards the left.

The optical system of the apparatus is shown in FIGS. 18, 18A, 20 and 21 taken in conjunction. Light is supplied to the apparatus by two identical mirror galvanometer assemblies 140 and 140' disposed on opposite ends of the aforedescribed drive mechanism and supported on carriages 155 and 155' respectively for axial displacement in unison therewith. The galvanometer assemblies are used in such a way that they produce variable density sound tracks. Such arrangement makes its possible to control the modulation by interposing a stationary mask 166 and 166' respectively of a shape so as to obtain a high level of undistorted modulation in the final positive sound track. The mask may have a shape similar to the shape shown in FIG. 13.

Galvanometer assembly 140 comprises a lamp 167 which sends its light by way of a condensing lens 168, mask 166 and a first surface mirror 169 to the mirror 170 of galvanometer 171. A lens 172 is mounted in front of mirror 170 so that the light passes through it twice. This lens forms an image of mask 166 on a slit 173 which is disposed so that its length extends horizontally, or at a right angle to the plane of the drawing. A lens 174 mounted close to slit 173 renders parallel the light coming from mirror 170 of galvanometer 171. This light then passes through a Dove prism 175 to another lens 176 which renders the beam of light sufficiently convergent to enter a cylindrical lens 177. Lens 177 is mounted within a tubular member 178 which in turn is united, for instance, by a screw connection to a rotary tubular member 125. Tubular member 178 is screwed into another tubular member 179 which in turn is rotatably fitted in tubular member 108. The latter member bridges the longitudinal gap between support sprockets 105 and 105'. A prism 180 mounted within tubular member 179 directs light received through lens 177 to a tiny cylindrical lens 181 which is very close to film supported on sprockets 105 and 105'.

Figure 20:
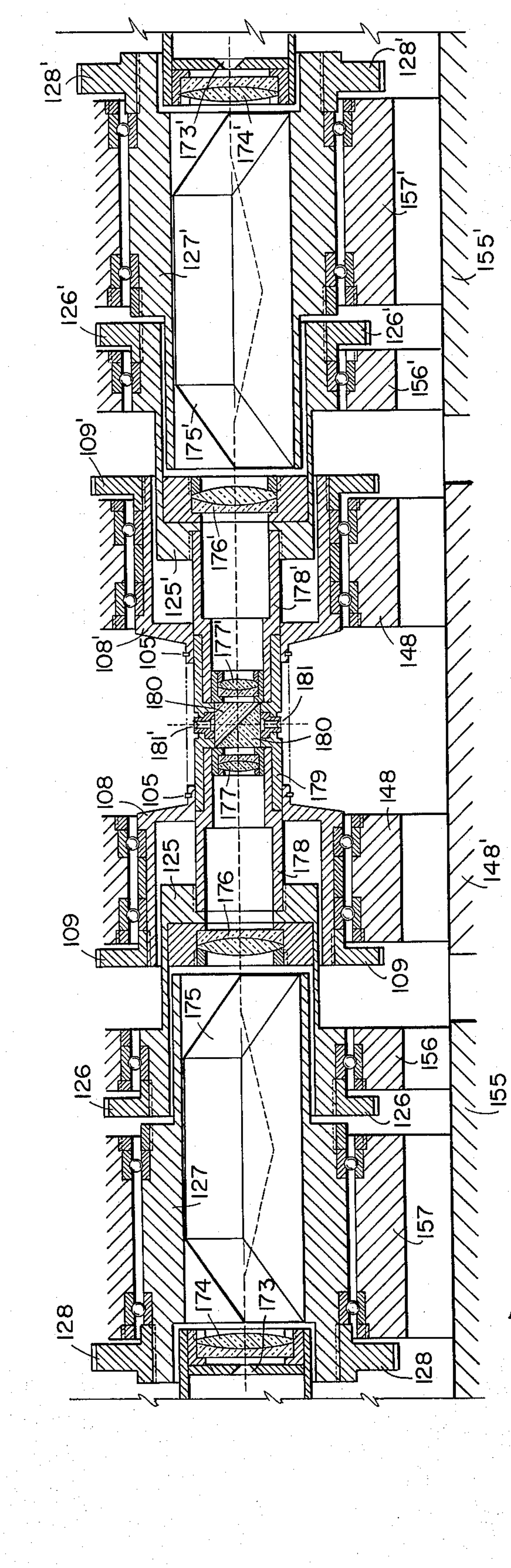
FIG. 20 shows part of FIG. 18 on an enlarged scale to illustrate the optical system of the apparatus.

The optical system heretofore described is duplicated on the right hand side of FIG. 20 as is indicated by the use of the same reference numerals though primed. Accordingly, prism 180' directs light received through lens 177' to a second tiny lens 181'. Lenses 181 and 181' with their mountings are located and adjusted so that they are exactly 180° apart with reference to the axis of rotation of tubular member 179 in which they are supported. Likewise, the two prisms are located very accurately concentric with the axis of member 179. By this construction, the paths of the light beams from lamps 167 and 167', after reflection from the hypotenuse faces of prisms 180 and 180', are very nearly parts of a straight line which intercepts the main axis of the system at right angles at its center and passes through the centers of tiny lenses 181 and 181'.

As has been described in connection with the description of the drive mechanism, gears 126 and 126' and with them tubular member 179 and the optical components mounted therein are driven from shaft 131 through gears 129 and 129'. The rate of rotation of the shaft and the ratio of transmission are so selected that tubular member 179 is driven at a suitable speed such as 120 revolutions per minute. This is equivalent to one revolution in one-half second, during which time one of the parallel lines to be recorded on the sound record area is recorded by each of the optical systems terminating in lenses 181 and 181'. The two shutters 138 and 138' (see FIGS. 18 and 18A) are so shaped and driven at such a speed that each will admit light when it its half of the optical system the respective terminal lens 181 or 181' is travelling downward on the side towards the observer from the top position in the drawing to the bottom position, and cut off the light while the respective terminal lens is traveling upward on the side away from the observer. As is apparent, a suitable timing and cycling of the shutters can be readily attained by an appropriate selection of the ratio of transmission of the gear trains. Instead of gear trains, a cycling control by cams can, of course, be employed. The movement of the two shutters is gradual so that due to the shutter configuration as shown in FIG. 18A, the aforedescribed necessary overlap of two successive record lines at their ends is attained.

As is indicated by arrows in FIG. 14, the entire system, when seen from the direction of galvanometer assembly 140, rotates in clockwise direction during a recording operation, and at the same time the lead screw 147 is moving carriages 155 and 155' towards the left, that is, from the position of FIG. 18 toward and into the position of FIG. 19. The recording starts at the right hand edge of the film just inside the sprocket holes as is indicated at S in FIG. 18 and ends at the left hand edge just inside the sprocket holes as is indicated at E in FIG. 19.

By the combined action of lenses 174, 176 and 177, the galvanometer mirror 170 is imaged through prism 180 and cylindrical lens 181 upon the sensitized side of the film facing lenses 181 and 181'. This imagery determines the length of the line of light which is formed on the sensitive surface of the film and, therefore, the width of the record line traced on the film. Lens 181 or 181' in combination with the respective prism and the respective anterior lenses forms a greatly reduced image of slit 173 or 173'. Practically any desired width of the line of light can be obtained by suitably correlating the optical components involved, such as a width of .0001 inch.

Since each slit 173 or 173' is horizontal, a rotation through 90° is required in order to have the narrow line image formed by the respective terminal lens lie parallel to the axis of rotation of the system as it must lie in order to be in a position at a right angle to the record lines to be formed on the sound record area. Such 90° rotation is accomplished by the Dove prisms in the position shown.

Each of the two Dove prisms serves a more general function in the system. Since the galvanometers and the associated optical parts up to and including lenses 174 and 174' respectively are stationary while lenses 176, 176', lenses 177, 177', prisms 180, 180', and terminal lenses 181, 181' rotate about the central axis of the apparatus, the angles between the slits and the axes of the terminal lenses by which the mirror images are imaged on the film, are constantly changing. The dove prisms 175 and 175' are mounted in tubular members 127 and 127' drivingly coupled with shaft 131. As is well known, rotation of a Dove prism about its longitudinal axis causes objects seen through it to appear to rotate about the projection of this longitudinal axis at twice the angular velocity at which the Dove prism is rotated. This phenomenon of Dove prisms is utilized in the apparatus according to the invention to cause each slit 173 or 173' to stand in a constant angular relationship to the terminal lenses as seen through the respective Dove prism, and for that purpose the ratio of transmission of the gear trains is such that the Dove prisms are rotated at one half of the speed at which tubular members 125 and 125' are rotated.

After the recording of the film section placed upon sprockets 105 and 105' has been completed, that is when the carriages have moved from the position of FIG. 18 into the position of FIG. 19, the film is advanced by temporarily closing switch 111. After the film has advanced through a distance sufficient to bring the next record area into position, the film drive is automatically terminated as previously described. In addition, carriages 155 and 155' and all the parts mounted thereon must be returned from the terminal position of FIG. 19 into the starting position of FIG. 18 before a new recording can be started. This is accomplished by reversing drive motor 135.

In order that the film carriages may be returned without fogging the film section now on sprockets 105 and 105' by the light coming through the optical system, the lamps 167 and 167' must either be turned off, or the light beams must be cut off in both optical systems. In practice, it is undesirable to extinguish the lamps while returning the carriage because an appreciable amount of time is required to stabilize the light of the lamp after they have been turned on and this would slow down the operation of the apparatus. Furthermore, when a lamp is turned on or off many times, its life is much shorter than when it burns steadily for relatively long periods of time.

Figure 22:
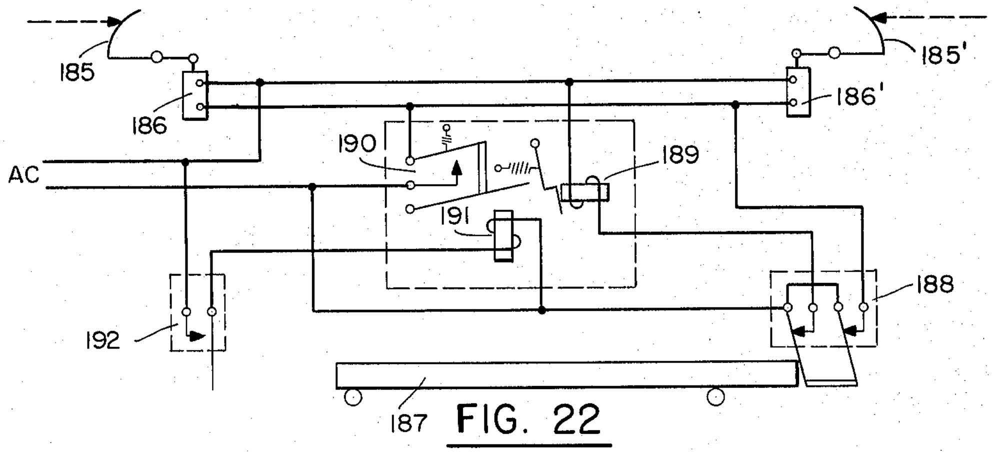
FIG. 22 is a circuit diagram showing the control of shutters as used in the light modulator according to FIG. 21.
Figure 22A:
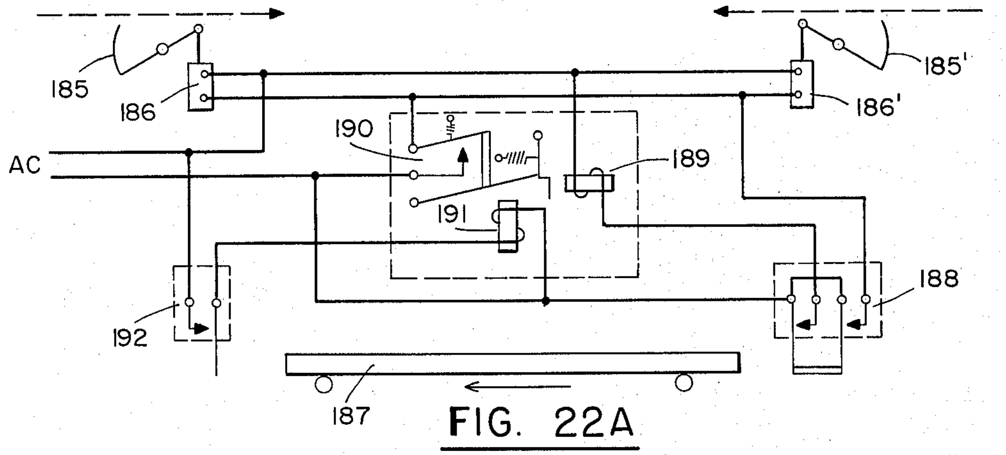
FIG. 22A shows the circuit diagram of FIG. 22 in another operational stage.
Figure 22B:
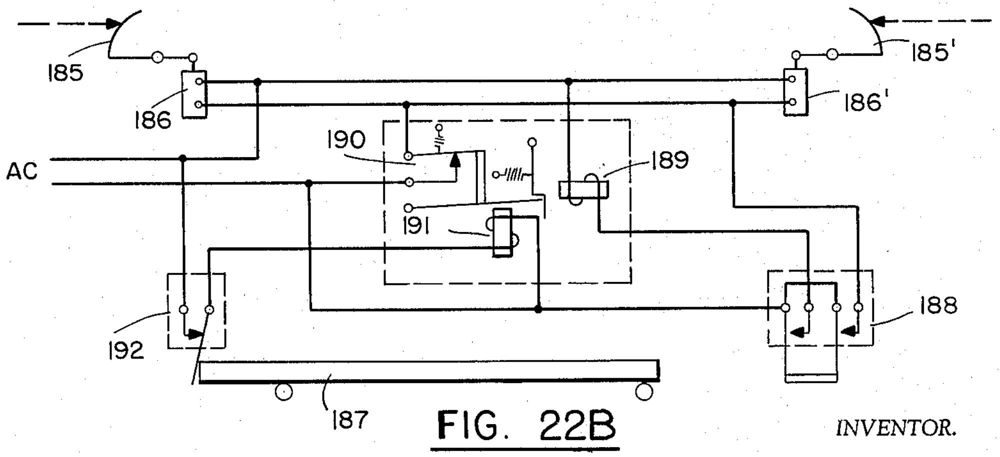
FIG. 22B shows the circuit diagram of FIG. 22 in still another operational stage.

The light beams during the carriage return may be cut off by a shutter 185 in each galvanometer assembly. The shutters are controlled by a solenoid 186, the energizing circuit of which, in turn, may be controlled by a switch ganged with the switch for reversing motor 135, or it may be controlled by a circuit arrangement as shown in FIGS. 22, 22A and 22B. The circuit system of these figures should be visualized as being controlled by the carriage movement as is indicated by a control bar 187 which should be assumed to move in unison with carriages 155 and 155'. FIG. 22 shows the carriage in one limit position and before recording starts. That is, both shutters should cut off the light beams. Solenoids 186 and 186' are energized from an A.-C. line to which they are connected by a double-throw switch 188, the contacts of which are closed by engagement with control bar 187. Closing of the contacts of switch 188 also closes an energizing circuit for the coil of a latch relay 189, the armature of which in turn controls a switch 190, further controlled by the state of energization of a solenoid 191. As soon as recording begins and bar 187 moves away from switch 188, the switch opens its contacts. As a result, solenoids 186 and 186' are de-energized and relay 189 is also de-energized. The shutters now move out of the path of the light beams (which are now under the control of shutters 166 and 166' respectively). This condition is shown in FIG. 22A. When bar 187 reaches a position of FIG. 22B, a switch 192 is closed. As a result, relay 191 is energized thereby closing switch 190 which in turn recloses the energizing circuit for solenoids 186 and 186'. Latch relay 189 remains de-energized thus freeing switch 190 for closing.

Figures 21, 23:
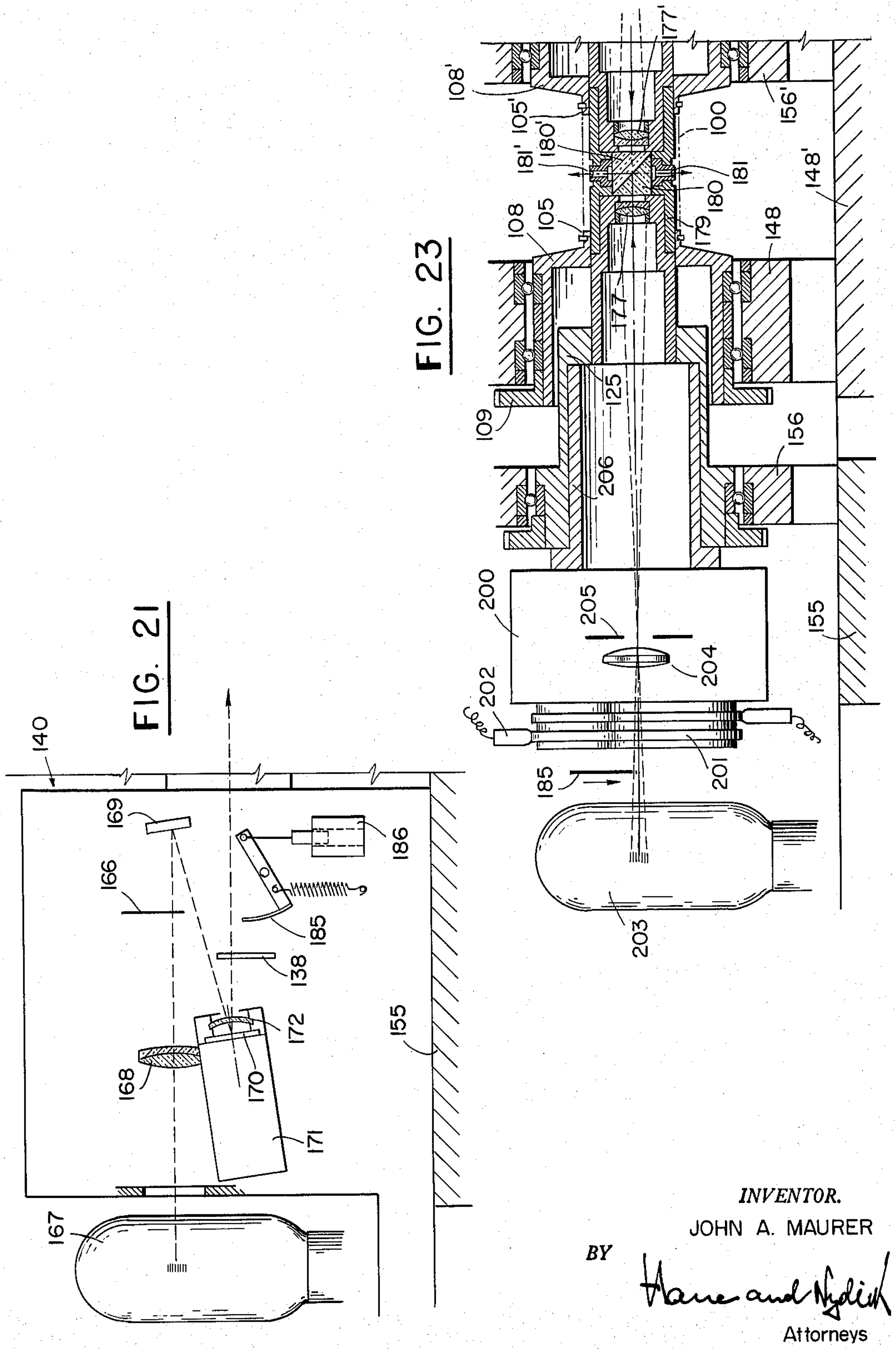
FIG. 21 is a diagrammatic view of a light modulator for the apparatus according to FIGS. 14 to 20.
FIG. 23 is a fragmentary elevational view, partly in section, of a further modification of the apparatus according to the invention.

FIG. 23 shows a modification of the recording apparatus just described. Only the left hand part of the apparatus is shown and the right hand part should be visualized as being identical.

The drive mechanism and the optical system are to a large extent identical with that shown in FIG. 20 as is indicated by using the same reference numerals for corresponding components. The apparatus of FIG. 23 is preferably equipped with shutters 185 as previously described.

The essential difference between the optical system of FIG. 23 and the optical system of FIG. 20 is that in FIG. 23 light valves 200 are used as light modulators. The light valves should be visualized as being of conventional design and similar in principle to the light valves shown in FIG. 6 and more in detail in FIG. 8. The audio frequency signals to be recorded are brought to the light valves through slip rings 201 and brushes 202 by means of which the output of a suitable audio amplifier is connected to the two light valves. The light valves on opposite sides of the apparatus may be operated either in series or in parallel. It is essential that the two light valves be identical in sensitivity and frequency response so that the light modulations they impart, will be identical. Both light valves are simultaneously supplied with the same audio signal. Light is supplied to each light valve from a lamp 203. Each lamp sends light through a condenser lens 204 and ribbons 205 of the kind described in detail in connection with FIG. 8. The longer dimension of the aperture between the ribbons of each light valve is imaged on the film by lens 177 and the shorter dimension of the aperture, that is, its width, is imaged on the sensitive surface of the film by the terminal lens 181.

Each light valve assembly, except its lamp, is secured to a tubular member 206 which extends into tubular member 125. Member 206 is rotatable jointly with member 125, but axially slidable with reference thereto, thus providing for adjustment of the light valves 50 that their ribbons are parallel and properly oriented with respect to lenses 177 and 181 and prism 180.

Recording on a sound record area placed on sprockets 105 and 105' is effected in the same manner as previously described, that is, terminal lenses 181 and 181' will alternately record successive parallel lines on the sensitized surface of the record area while the entire system is gradually moving from the right toward the left.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An apparatus for optically recording on a strip of light sensitive film a sound record area of separate parallel sound record lines extending substantially longitudinally of said film, said apparatus comprising a cylindrically curved hollow film support means for stationarily supporting the film area to be recorded upon in a cylindrically curved configuration about an axis transversely of the length of the film, light modulating means disposed at opposite ends of said film support means, each for directing a beam of equally modulated light to be recorded toward and through the respective end of the support means coaxially therewith, said support means including a window to expose the film area to be recorded upon, an optical light deviating means optically interposed in the beam of each light modulating means, first drive means for simultaneously rotating and axially displacing both light deviating means jointly and in the same direction from a respective initial position, each of said light deviating means including lens elements and light deflecting elements disposed within the support means for reflecting a radially directed concentrated beam of modulated light upon the same stationarily supported and exposed film area rotating along the inner peripheral outline thereof, said radial beams being oppositely directed in reference to a common point on the axis of the film support means, an obturating means for each of said light modulating means movable between a position obturating the respective beam and a position uncovering the respective beam, and second drive means drivingly coupled with both said obturating means for alternately and gradually moving the same into and out of the obturating position, said first and second drive means being so correlated that each radial beam impinges upon the supported film during part of the rotation of the beam only whereby said radial beams alternately record on said stationarily supported film area successive separate and parallel lines helically progressing from one longitudinal edge of the film strip toward the other, said light deviating means being jointly returnable into the initial positions.

2. An apparatus according to claim 1 and comprising film guide means for guiding said strip of film over said support means, and third drive means for moving said strip of film over said support means to place successive strip portions in position for recording.

3. An apparatus according to claim 2 and comprising control means for said third drive means to move the same through a predetermined distance in response to an actuation of the control means.

4. An apparatus according to claim 1 wherein said light modulating means are mounted for joint axial displacement with the respective light deviating means.

5. An apparatus according to claim 1 wherein each of said light deviating means comprises a right angle, triangular prism disposed within the hollow stationary film support means rotatable independent thereof so that the mid point of the hypotenuse of the prism intersects the axis of the support means, lens elements having an optical center axis coinciding with the axis of said support means for directing the respective modulated beam upon said mid point of the hypotenuse, and a terminal lens element rotary about the axis of said support means and positioned to reflect the respective beam from the mid point of the hypotenuse of the respective prism upon the supported film area, said terminal lens elements being disposed diagrammatically opposite whereby said oppositely directed radial beams constitute a single substantially straight line perpendicular to the axis of said film support means.

6. An apparatus according to claim 1 wherein said light modulating means are light valves mounted axially displaceable in unison with said light deviating means.

7. An apparatus according to claim 1 wherein said light modulating means are mirror galvanometers mounted axially displaceable in unison with said light deviating means.

8. An apparatus according to claim 1 wherein said light modulating means are mirror galvanometers and a stationary mask including a slit is interposed between each galvanometer and the respective light deviating means, the beam of each galvanometer being imaged through the respective slit upon the supported film area, and wherein each of said light deviating means includes a Dove prism rotatably disposed coaxially with the axis of the film support means and between the light deflecting means of the light deviating means and the respective galvanometer.

9. An apparatus according to claim 8 and comprising a third drive means for rotating said Dove prism at half the rotational speed of the lens elements and the light deflecting means of the respective light deviating means.

10. An apparatus according to claim 9 and comprising a drive shaft common to said three driving means, and transmission means drivingly coupling said drive means tó said shaft at selected ratios of transmission.

11. An apparatus according to claim 1 and further comprising a second beam obturating means for each light modulating means, each of said second obturating means being movable into and out of a beam obturating position, and means for moving both second obturating means into the respective obturating position during the return of the light deviating means into the initial positions.

12. An apparatus according to claim 1 and comprising a bed, a support block stationarily mounted on said bed and supporting said support means, two carriages slidably supported on said bed on opposite sides of said block, each of said carriages supporting one of the light modulating means and one of said light deviating means, said latter means being rotatably mounted on the respective carriage, said carriages being ganged for joint rectilinear displacement in either direction in reference to said block.

13. An apparatus according to claim 12 wherein said film support means and both said light deviating means are each mounted in a tubular member, said tubular members being supported on the bed in axial alignment and rotatably independent of each other, the tubular member for the film support means being stationary during recording and rotation of said member effecting movement of a film area supported on the support means out of said position and movement of another film area into said position.

References Cited by the Examiner

UNITED STATES PATENTS

| | | | |
|---|---|---|---|
| 1,800,031 | 4/1931 | Schroter | 346—108 X |
| 2,484,881 | 10/1949 | Fuschi | 274—41.6 |
| 2,876,295 | 3/1959 | Irby | 179—100.2 |
| 2,885,490 | 5/1959 | Pettus | 179—100.3 |
| 2,912,517 | 11/1959 | Pfost | 179—100.2 |

FOREIGN PATENTS

| | | |
|---|---|---|
| 539,115 | 7/1955 | Belgium. |

IRVING L. SRAGOW, *Primary Examiner.*

L. MILLER ANDRUS, JOHN P. WILDMAN, BERNARD KONICK, *Examiners.*

H. W. GARNER, M. GINSBURG, J. P. SCHERLACHER, G. LIEBERSTEIN, *Assistant Examiners.*